Aug. 16, 1966        A. E. POPODI ETAL        3,267,265
RANDOM ACCESS INSTANTANEOUS DIGITAL-TO-ANALOG
CO-ORDINATE CONVERTER
Filed Oct. 4, 1963
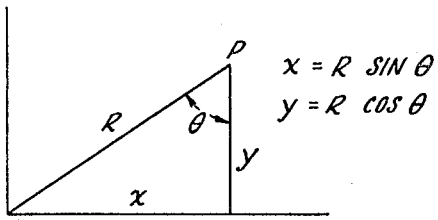
Fig. 1.
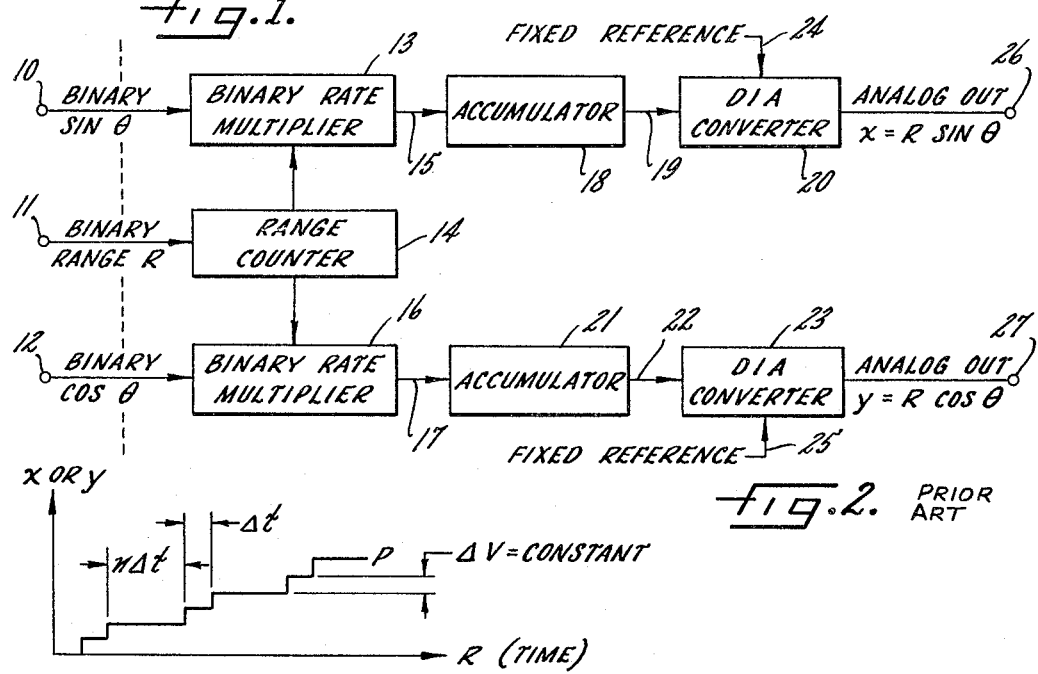
Fig. 2. PRIOR ART
Fig. 3. PRIOR ART
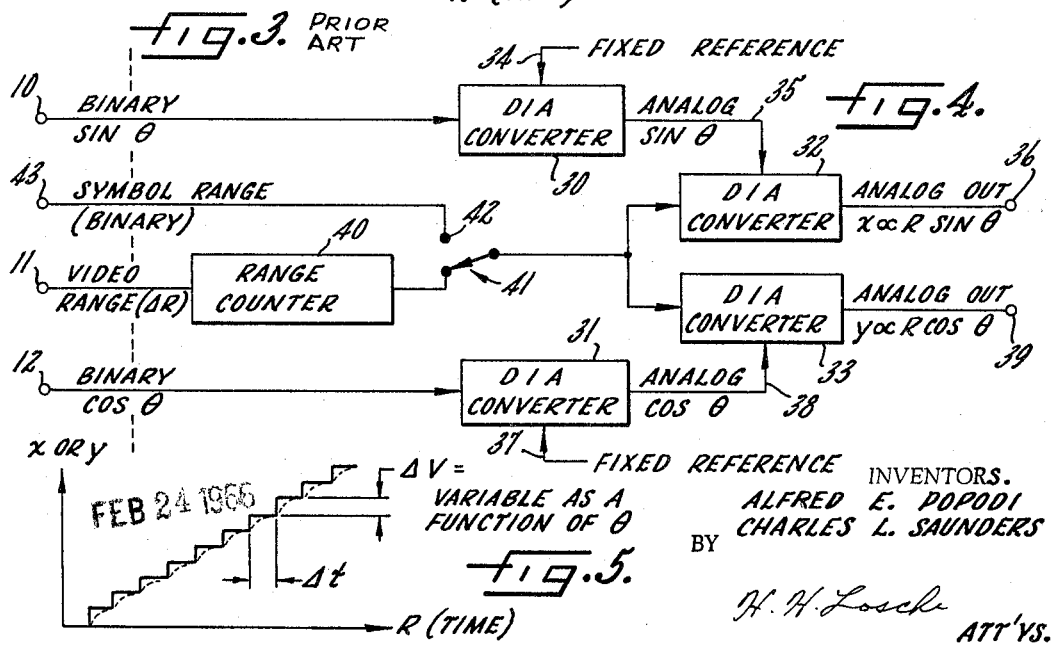
Fig. 4.
Fig. 5.
INVENTORS.
ALFRED E. POPODI
CHARLES L. SAUNDERS
BY
H. H. Losche
ATT'YS.

United States Patent Office 3,267,265
Patented August 16, 1966

3,267,265
RANDOM ACCESS INSTANTANEOUS DIGITAL-TO-ANALOG CO-ORDINATE CONVERTER
Alfred E. Popodi, Glen Burnie, and Charles L. Saunders, Severna Park, Md., assignors, by mesne assignments, to the United States of America as represented by the Secretary of the Navy
Filed Oct. 4, 1963, Ser. No. 314,079
5 Claims. (Cl. 235—154)

This invention relates to digital-to-analog converters and more particularly to a random access digital-to-analog co-ordinate converter for substantially instantaneously converting radar range and azimuth signal information in binary word form of a target object into analog voltage co-ordinate information which is useful to position the target on a cathode ray tube display, or the like.

In the course of processing radar data of target objects for display on cathode ray tube indicators, such as for plan position indicators (PPI), it is necessary to derive target co-ordinates $x$ and $y$ in analog form from radar data of range R and azimuth $\theta$ in binary form. Modern radars accomplish target acquisition by digital quantization means to improve radar accuracy and circuit memory. Such digital detection radars provide target information, such as the sine and cosine of the azimuth factor, $\theta$, and range, R, in binary word form. Digital detection radar techniques are more fully described in the text, Introduction to Radar Systems, by Sholnik, 1962, section 9.9 entitled "Binary Integration" and also in the publication, IRE Transactions on Information Theory, vol. IT-1, March 1955, the article by J. V. Harrington entitled "An Analysis of the Detection of Repeated Signals in Noise by Binary Integration."

In the past, two schemes have been used to get target information into co-ordinates for cathode ray tube display. One scheme utilized an electromechanical system employing syncro servos driving sine and cosine resolvers which generate the desired horizontal and vertical deflection voltages for the cathode ray tube. Because of its inherent slowness, this scheme is insufficient for many radar target detection systems. The second scheme is an electrical system devised to be used with a digital detecting type of radar. This system is illustrated in one of the figures of drawing and will be described more fully in connection with that figure as background for the present invention.

In this invention four digital-to-analog converters are used to perform substantially all the operations necessary to convert the digital target information into analog voltage co-ordinate information that can be readily applied to a cathode ray tube indicator for target display, or for other uses. One converter has a digital word representative of the sin $\theta$ azimuth data applied as an input thereto while another converter has a digital word representative of the cos $\theta$ azimuth data applied as an input. These two converters have a fixed reference voltage applied as a second input to produce analog sin $\theta$ and cos $\theta$ voltages on the outputs thereof. These analog voltage outputs are applied as one of the inputs to third and fourth digital-to-analog converters as the voltage reference therefor varying in accordance with the sin $\theta$ and cos $\theta$ analog voltage functions. The digital word representing range is applied in common to the third and fourth converters to produce the analog voltage co-ordinates R sin $\theta$ and R cos $\theta$, respectively, on the third and fourth converter outputs, being the $x$ and $y$ voltage co-ordinates, respectively. An alternately seated switch may be used in the coupling of the range digital word to the third and fourth converters to alternately switch in a digital word simulating a target range, where desired. This means of converting azimuth and range information from binary signals to analog voltage signals is extremely fast. It is therefore a general object of this invention to provide a digital-to-analog converter for substantially instantaneous conversion of radar digital target azimuth and range information into analog voltage information for use in driving the horizontal and vertical deflection circuits of a cathode ray tube target display indicator, or for other uses.

These and other objects and the attendant advantages, features, and uses of the invention will become more apparent as the description proceeds when considered along with the accompanying drawings, in which:

FIGURE 1 is a vector diagram of a target object;
FIGURE 2 is a block diagram of a random access co-ordinate converter;
FIGURE 3 illustrates the ramp generation using binary rate multipliers as shown in FIGURE 2;
FIGURE 4 is a block circuit diagram illustrating the random access instantaneous co-ordinate converter in accordance with this invention; and
FIGURE 5 illustrates the ramp generation produced from the circuit of FIGURE 4.

Referring more particularly to FIGURE 1, there is shown a geometrical diagram of a target object at a point P and the relationship of the target object co-ordinates $x$ and $y$ with respect to the range, R, and the azimuth given in sine and cosine values of $\theta$.

Referring more particularly to FIGURE 2, a co-ordinate converter circuit is shown in which the inputs of the range of azimuth radar information are given in binary form as where a binary integration type of radar or radar of the digital detection technique is used to produce the binary information. This circuit is used to convert the binary information into analog voltage $x$ and $y$ co-ordinates for driving the deflection circuits of a cathode ray tube target indicator (not shown). The information supplied by the digital detection type radar is shown applied to terminals 10, 11, and 12, to the left of the broken line in this figure. A digital or binary word is applied at terminal 10 for the sin $\theta$ azimuth function of a target, as shown in FIGURE 1. The binary or digital word of the cos $\theta$ azimuth function of the target, as shown in FIGURE 1, is applied to terminal 12. The range is represented in binary or digital pulses to provide the binary number representative of the range at terminal 11. The azimuth sin $\theta$, cos $\theta$, and range, R, functions come from the digital detection type radar and are produced in the binary numerical or digital number forms in the radar circuit in any well-known manner as disclosed in the above-mentioned text, Introduction to Radar Systems, section 9.9. The sin $\theta$ and cos $\theta$, or azimuth signal information, may come out of the radar from a digital sine wave generator, a diode matrix, a binary shaft encoder, or any other well-known encoding means and the range voltage, R, may come from any quantizer circuit as illustrated in the above-mentioned text.

The binary sin $\theta$ signal applied at terminal 10 is entered into a binary rate multiplier 13 in parallel form. The binary range number, R, applied to terminal 11 is coupled to a range counter 14, the range counter output being applied as a second input to the rate multiplier 13 where the sin $\theta$ and R binary values are multiplied to produce a train of output of pulses representative of the multiplication of the sin $\theta$ and R factors on the output 15 thereof. In like manner the cos $\theta$ binary word is applied to a binary rate counttr 16 to be multiplied by the range digital word, R, coming as an output from the range counter 14 to produce a train of pulses on the output 17. Binary rate multipliers 13 and 16 may be of the type shown and described in the text Fundamentals of Digital Computers by Mandl, 1958, in the section "Parallel-Shift Multiplier" beginning on page 149. The output 15 of the binary rate multiplier 13, is coupled to an accumulator 18, the output 19 of which is coupled as one input to a digital-to-analog convtrter 20. In like manner, the output 17 of the multiplier 16 is coupled to an accumulator 21, the output 22 of which is coupled to a digital-to-analog converter 23. Each of the digital-to-analog converters 20 and 23 has a fixed reference voltage 24 and 25, respectively, coupled as a second input thereto. The output 26 of the converter 20 will have the analog voltage representative of $R \sin \theta$ being the $x$ co-ordinate voltage desired for the horizontal deflection circuit of a cathode ray tube. In like manner the output 27 from the converter 23 will produce the $y$ voltage co-ordinate of $R \cos \theta$ for the vertical deflection circuit of a cathode ray tube adapted to be coupled thereto.

The digital-to-analog converters 20 and 23 may be of any well-known and conventional type to produce the conversion from digital values to analog values. Such converters are more fully described in the texts Digital Computer Components and Circuits by R. K. Richards, (1958) beginning on page 494, and in Analog Computers by A. S. Jackson, (1960) section 14–3.

Referring more particularly to FIGURE 3, with reference to FIGURE 2, one of the disadvantages of the binary multipliers 13 and 16 is that, since the binary rate multiplication is based on the reduction of the binary pulse rate, the output pulses have unequal spacing with respect to time and the cathode ray tube beam will therefore be deflected accordingly, producing a nonlinear appearance. The periods of time are shown as $\Delta t$ in FIGURE 3 and the increments of voltage are shown as $\Delta V$. The time spacings $n\Delta t$ show the unequal spacings of the ramp generators, $n$ always being an integer and variable. This effect is usually removed at the expense of instrumenting more binary bits than can be optically resolved.

Another objection to the converter disclosed in FIGURE 2 is that the binary rate multipliers cannot perform instant multiplications and, accordingly, are too slow for some radar detection operations. Radar displays which require random access symbol writing do not allow long computing times. Therefore, if symbols are to be received in direction-cosine form, as R, $\sin \theta$, and $\cos \theta$, additional circuits must be added for parallel, high speed multiplication. This is unfortunate since symbol data and search video PPI type cathode ray tubes are normally time shared on a single gun of the cathode ray tube. It is desirable, therefore, to implement a common converter for the range and azimuth functions, R and $\theta$, to convert these functions to $x$ and $y$ functions with the flexibility to be time shared by both categories of data.

Referring more particularly to FIGURE 4, the range and azimuth information are supplied to terminals 10, 11, and 12, from the digital detection radar to the left of the dotted line in the same manner as supplied for the converter circuit of FIGURE 2. By this invention, four digital-to-analog converters 30, 31, 32, and 33, are coupled in a novel manner to produce substantially instanteously the analog voltage co-ordinates $x$ and $y$. The binary word $\sin \theta$ applied to terminal 10 is coupled by one input to the computer 30, the second input thereto being a fixed voltage applied by way of conductor means 34. The digital to analog converter 30 is of the same type as converters 20 and 23 in FIGURE 2 and readily produces the analog voltage of the $\sin \theta$ digital word on the output 35. The analog voltage on the output 35 of the converter 30 is applied as the reference voltage to the digital-to-analog converter 32, this analog voltage varying in accordance with any variance in the $\sin \theta$ value. In like manner, the binary $\cos \theta$ digital word applied to terminal 12 is coupled as one input to the digital analog converter 31, this converter having a fixed reference voltage applied by way of conductor 37. Converter 31 produces the analog voltage of the binary $\cos \theta$ word on the output conductor means 38 which is applied as the reference voltage to the digital-to-analog converter 33. Range signal pulses applied at terminal 11 from the quantizer circuits, or the like, of the radar are counted in a range counter 40, the output of which is coupled through switch 41 in common to both converters 32 and 33. Converter 32 will produce an output analog voltage at terminal 36 of $R \sin \theta$, being the $x$ co-ordinate analog voltage which may be coupled to the horizontal deflection circuits of a cathode ray display tube (not shown). Converter 33 will instantly convert the digital range word with respect to the $\cos \theta$ analog reference voltage into an analog voltage at the output 39 representative of $R \cos \theta$, or the $y$ voltage co-ordinate which is adapted to be coupled to the vertical deflection circuits of the cathode ray tube (not shown). Since the four digital-to-analog converters make substantially instantaneous conversion of the azimuth and range binary words into analog voltage, this circuit is desirable for rapid operation in displaying target objects detected by the radar system.

Referring more particularly to FIGURE 5, the ramp function shown in this figure results from the operation of the circuit in FIGURE 4 and it may be seen that both the $x$ and $y$ functions are developed in equal increments of time $\Delta t$, the increments of $\Delta V$, being variable as a function of $\theta$. The $\Delta t$ and $\Delta V$ increments as shown in FIGURE 5 may be smoothed by smoothing circuits as desired.

Referring again to FIGURE 4, switch 41 is an alternately seated switch, one contact 42 of which is coupled to a terminal 43 capable of supplying a binary range word to simulate actual range. Whenever it is desirable to display a simulated target, switch 41 may be switched to the upper contact 42. The simulated target may also be used for testing the converter circuit and the cathode ray tube display and time-sharing of a cathode ray tube to display either target data is of no consequence.

While many modifications and changes may be made in the constructional details and features of this invention to accomplish the same results and functions as taught herein, applicants desire to be limited in their invention only by the spirit and scope of the appended claims. Although the analog co-ordinate voltages are described herein as being used to drive the deflection circuits of a cathode ray tube as an example to give operative vitality to the invention, it is to be understood that these analog co-ordinate voltages may be utilized for other purposes without departing from the spirit and scope of the invention.

We claim:

1. A random access digital-to-analog instantaneous signal converter comprising:

two pairs of digital-to-analog converters, the first pair each having a fixed reference voltage applied as one input thereto and the second pair each having the outputs, respectively, of the first pair as one input thereto;

first and second binary intelligence signals applied as a second input to each, respectively, of said first pair of digital-to-analog converters; and a third binary intelligence signal applied in common as a second input to said second pair of digital-to-analog converters, said second pair of digital-to-analog converters each having an output of analog voltage whereby analog voltages resulting from said first and third and said second and third intelligence signals are instantaneously produced.

2. A random access digital-to-analog instaneous co-ordinate converter comprising:

two pairs of digital-to-analog converters, each having two inputs and an output, the first pair each having a fixed reference voltage applied to one input of each and the second pair each having one of the inputs thereof coupled to the outputs of said first pair, respectively;

first and second co-ordinate binary intelligence signals applied to the second inputs of said first pair of digital-to-analog converters; and a third vector binary intelligence signal applied in common to the second inputs of said second pair of digital-to-analog converters whereby analog voltages providing co-ordinates for a point with respect to the first and second co-ordinate binary intelligence and said vector intelligence is established instantaneously.

3. A random access digital-to-analog instantaneous co-ordinate converter as set forth in claim 2 wherein said vector binary intelligence signal is a binary number produced by a series of pulses representative of the range of a target produced from a range binary counter, and said first and second co-ordinate binary intelligence signals are binary words representative of the sine of the angle $\theta$ and the cosine of the angle $\theta$, respectively, where $\theta$ is the azimuth angle from the point of observation to the target.

4. A random access digital-to-analog instantaneous co-ordinate converter comprising:

two pairs of digital-to-analog converters, each converter having two inputs and an output, the first pair of converters each having a fixed reference voltage coupled to one input thereof and the second pair of converters each having one of the inputs thereof coupled to the outputs of said first pair of converters, respectively;

a digital word, representative of the sin $\theta$ function of a target position with respect to a point of observation, applied to the second input of one of said converters of said first pair of converters to produce an analog voltage corresponding to said sin $\theta$ function on the output of said one converter;

a digital word, representative of the cos $\theta$ function of the target position with respect to the point of observation, applied to the second input of the other of said converters of said first pair of converters to produce an analog voltage corresponding to said cos $\theta$ function on the output of said other converter; and a range counter for counting out a digital word, representative of the range of the target from the point of observation, having its digital word output applied to the second inputs of said second pair of converters, in common, to produce analog voltages on the outputs of said second pair of converters of the range and sin $\theta$ function and of the range and cos $\theta$ function providing co-ordinate voltages of the target with respect to the point of observation.

5. A random access digital-to-analog instantaneous co-ordinate converter to provide co-ordinate analog voltages of a radar detected target comprising:

first, second, third, and fourth digital-to-analog converters, each converter having two inputs and an output, the output of said first converter being coupled to one input of said third converter and the output of said second converter being coupled to one input of said fourth converter;

a fixed voltage reference applied to one input of each of said first and second converters;

a digital word, representative of the sin $\theta$ function of a target position with respect to a point of observation, applied to the other input of said first converter to produce an analog voltage on the output of said first converter representative of said sin $\theta$ function;

a digital word, representative of the cos $\theta$ function of the target position with respect to the point of observation, applied to the other input of said second converter to produce an analog voltage on the output of said second converter representative of said cos $\theta$ function;

a range counter for counting out a digital word, representative of the range of the target from the point of observation;

an input of range digital pulses coupled to said range counter;

an input of a binary word representative of a symbol range; and a switch having a switchable blade coupled in common to the other inputs of said third and fourth converters and having two switch contacts, one contact of which is coupled to said range counter and the other contact of which is coupled to said input of a binary word, said switch blade being alternately in contact with said two switch contacts whereby the outputs of said third and fourth converters provide instantaneous analog voltage of the product of range and the sin $\theta$ function and of the range and the cos $\theta$ function, respectively, to provide co-ordinate analog voltages adaptable to position the target on a cathode ray tube display.

No references cited.

MAYNARD R. WILBUR, *Primary Examiner.*
DARYL W. COOK, *Examiner.*
A. L. NEWMAN, *Assistant Examiner.*